United States Patent [19]

Strothmann

[11] Patent Number: 5,745,880
[45] Date of Patent: Apr. 28, 1998

[54] SYSTEM TO PREDICT OPTIMUM COMPUTER PLATFORM

[75] Inventor: Russell L. Strothmann, Broken Arrow, Okla.

[73] Assignee: The Sabre Group, Inc., Fort Worth, Tex.

[21] Appl. No.: 316,890

[22] Filed: Oct. 3, 1994

[51] Int. Cl.$^6$ .................................................. G06F 17/60
[52] U.S. Cl. ......................... 705/7; 364/400; 705/1; 705/10; 705/400
[58] Field of Search .................. 364/400, 464.1; 395/201, 207, 210; 708/1, 7, 10, 400

[56] References Cited

U.S. PATENT DOCUMENTS

| | | | |
|---|---|---|---|
| 3,628,904 | 12/1971 | Canguilhem | 444/1 |
| 4,694,282 | 9/1987 | Tamura et al. | 340/539 |
| 4,744,028 | 5/1988 | Karmarkar | 364/402 |
| 5,063,506 | 11/1991 | Brockwell | 364/401 |
| 5,233,513 | 8/1993 | Doyle | 354/401 |
| 5,249,120 | 9/1993 | Foley | 395/201 |
| 5,263,164 | 11/1993 | Kannady et al. | 395/700 |

OTHER PUBLICATIONS

Caldwell, Bruce, "Looking Beyond the Costs," *Information Week*, Jan. 3, 1994, pp. 50–56.

*Primary Examiner*—Edward R. Cosimano
*Attorney, Agent, or Firm*—Head, Johnson & Kachigian

[57] ABSTRACT

A system to evaluate movement of computer application functions from an existing computer system platform to an alternate computer system platform. The process includes determining the cost of a generic computing unit by dividing the total costs of the existing computer system platform by the total number of application functions. The percentage of the generic unit attributable to various categories is determined, including hardware and software, support and personnel, and facility costs. Yearly percentage cost changes for the existing computer system platform for a selected number of years are applied in each category. Training costs per generic unit for the alternate computer system platform are applied. The conversion costs per generic unit are applied to the generic unit. The costs of each category in the alternate computer system as a percentage of the existing computer system platform costs are applied to the generic unit to produce comparative costs of the alternate environment.

8 Claims, 4 Drawing Sheets

SYSTEM TO PREDICT OPTIMUM COMPUTER PLATFORM

BACKGROUND OF THE INVENTION

1. Field of the Invention

The present invention is directed to a system to optimize costs of processing of computer application functions. In particular, the present invention is directed to a system to evaluate movement of computer application functions from an existing computer system platform to an alternate computer system platform.

2. Prior Art

Advances in computer equipment and technology have made possible processing of applications on various computer systems which were hitherto relegated to mainframe computers.

Presently, various options are available to process computer application functions. Broadly, an application function is defined as a task to be performed. Examples would be an accounts receivable program, a reservations program, or a payroll program.

Traditionally, mainframe computers have been used to process functions on a large scale. Mainframes are the largest, fastest, and most expensive class of computers capable of solving problems or manipulating data by accepting data, performing prescribed operations, and supplying results of these operations.

Over the years, additional types of computer platforms have evolved. There are mid-range computer platforms many of which function as multi-user systems with up to several hundred terminals. One type is a client/server arrangement having a hardware platform that provides commonly used services to a larger number of clients. One example would be some Unix™ based systems. Finally, a premise or PC environment platform is possible. It will be understood that there is presently overlap in these computer platforms which will only increase with increasing advances in technology.

There is presently a trend at many businesses that have mainframe computer systems to move, migrate or shift down work from the mainframe computer to a lower level computer system platform, such as moving from a mainframe environment to a Unix client/server environment. While a mid-range computer platform may be less costly than a mainframe, there are various other cost factors that may be considered before the economic viability of migration of computer applications may be decided upon.

In order to migrate an application or applications, the program code must be able to run on the alternate platform. One method is to recompile existing code for use on the target platform. Another method is to convert the mainframe code to work with compilers and databases on the target platform. A further method is to develop an entirely new application and new code for the target platform.

These conversion costs must be factored into the decision making on migrating of a computer program.

Additionally, there are training costs for an alternate computer platform.

In addition to the hardware and software costs associated with the alternate platform, there are facility and plant costs, and support and personnel costs.

It would be advantageous to develop a system to determine the economic viability of placing particular applications or functions on an alternate, lower level computer platform prior to moving the particular applications or functions.

Accordingly, it is a principal object and purpose of the present invention to provide a decision making tool to determine the economic viability of moving existing data processing applications from an existing computer platform to alternate computer platforms.

It is an additional object and purpose of the present invention to provide a system to compare costs between an existing computer platform and an alternate computer platform taking into account a wide variety of cost factors.

It is an additional object and purpose of the present invention to provide a system to predict the optimum number of application functions to move to an alternate computer platform.

It is an additional object and purpose of the present invention to provide a system to compare costs between an existing computer platform and an alternate computer, taking into account possible projected revenue changes.

DETAILED DESCRIPTION OF THE PREFERRED EMBODIMENTS

Figure 1:
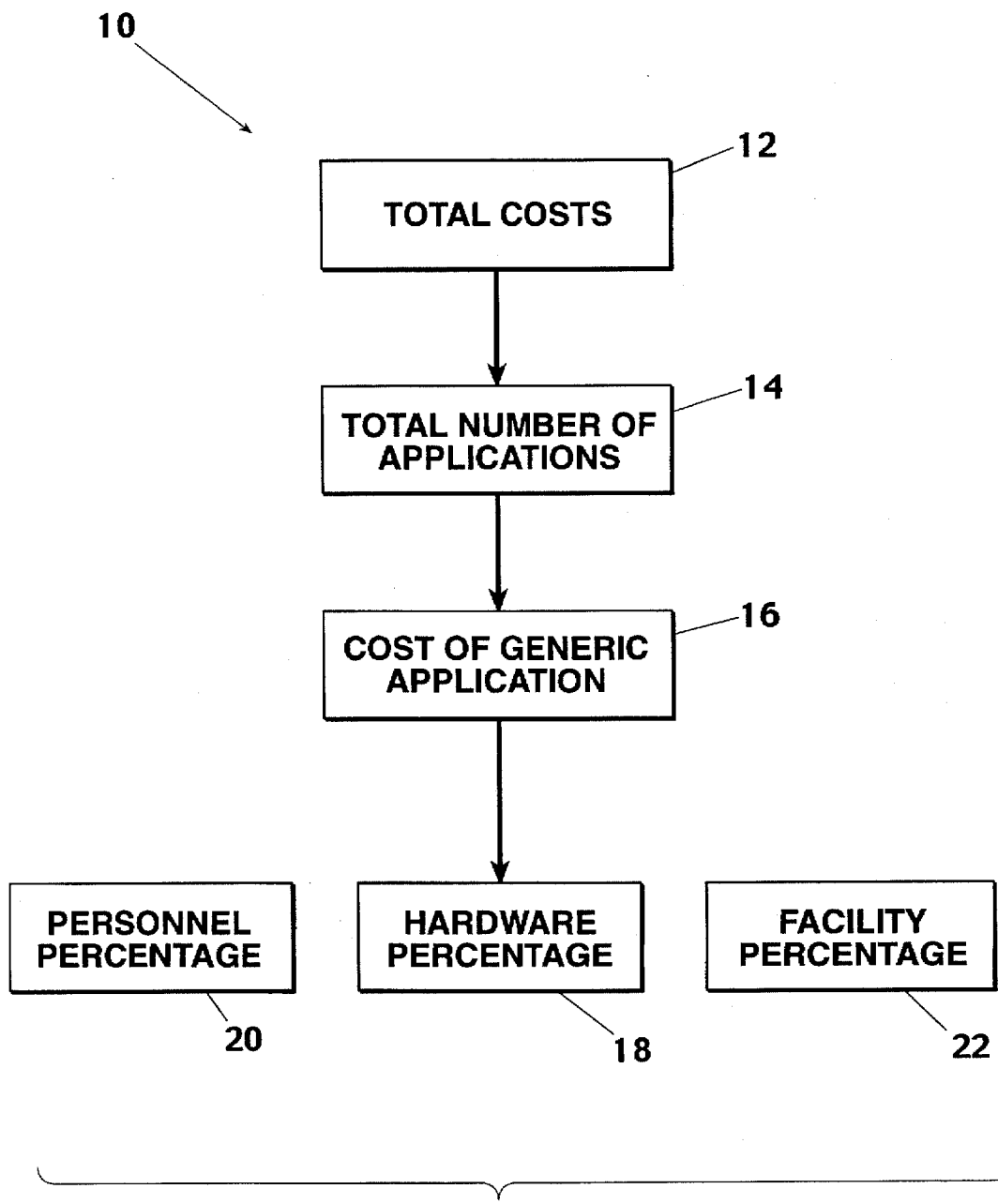
FIG. 1 illustrates a simplified flow chart of the initial portion of the system for optimizing choice of the computer system platform between an existing platform and an alternate platform.

Referring to the drawings in detail, FIG. 1 shows a block diagram flow chart revealing a portion of the system 10 to predict an optimum computer platform for processing of application functions.

As will be described herein, the system is ideally designed to evaluate movement or migration from an existing computer system platform to an alternate computer system platform for at least one application function. The system can also be used to compare the cost of two new platforms although the required input may be more difficult without existing costs.

The present system can predict the optimum computer platform for moving or migrating a single application function, for migrating all of the functions on the existing computer platform, for migrating a selected number of functions.

The present system is ideally suited to be used with various spread sheet software programs that are currently marketed. As an example, the present system may be used with the EXCEL™ spreadsheet program marketed by MicroSoft.

The user will estimate or make projections in various categories as input into the system.

Initially, the total costs of operating the existing computer platform will be added together for a selected time period (TIME 1). These costs may be in numerous categories. In the present embodiment, three broad categories are identified—hardware and software costs, plant or facility costs and support or personnel costs. While three categories are utilized in the present embodiment, it will be possible for more or less categories to be utilized. These are the total costs shown at box 12 of the present, existing computer platform.

In a preferred embodiment, TIME1 is a one year duration although it will be recognized that other time periods may be selected within the confines of the present invention.

As an example, the total yearly costs of all three categories total one hundred million dollars ($100,000,000). As seen at box 14 in FIG. 1, the total number of chargeable or billable function applications performed by the existing computer platform system is then determined. By dividing the total yearly costs by the total number of applications, the costs for a generic single function or application are determined as illustrated by box 16. Again, by way of example, if a total of one thousand (1000) functions are being processed by the current computer platform, the cost of a generic computing function would be one hundred thousand dollars ($100,000). The generic unit, thus, represents the cost of an average function within the existing platform. As can be seen, the generic unit does not necessarily correspond with any single particular function but is a base point for the system.

As will be described herein, the system does not quantify the number of costs associated with the alternate environment but identifies costs of operation of the application.

Existing Platform Projections

Thereafter, the percentage of the total current platform costs as shown at box 12 attributable or applicable to the broad categories will be determined as shown at boxes 18, 20 and 22. By way of example, hardware and software 18 costs may entail fifty percent (50%) of the total; support and personnel costs 20 may entail twenty five percent (25%) of the total; and facility and plant costs 22 may be responsible for twenty five percent (25%) of the costs. The total of the percentages should add to 100%

Figure 2A:
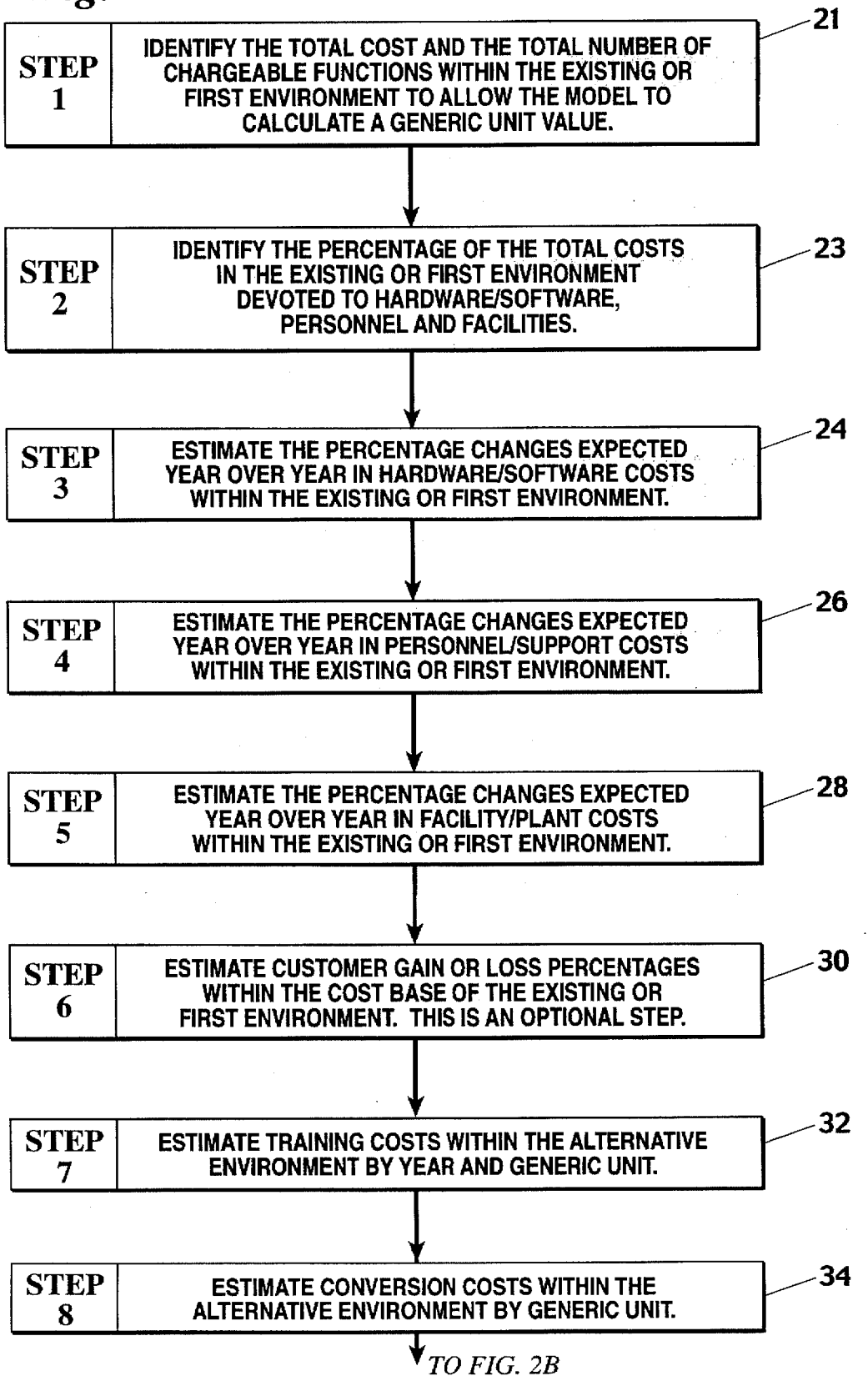
FIGS. 2(A), 2(B), and 2(C) illustrate a simplified block diagram flow chart of the remaining steps of the process to optimize choice by a computer platform in accordance with the present invention.
Figure 2B:
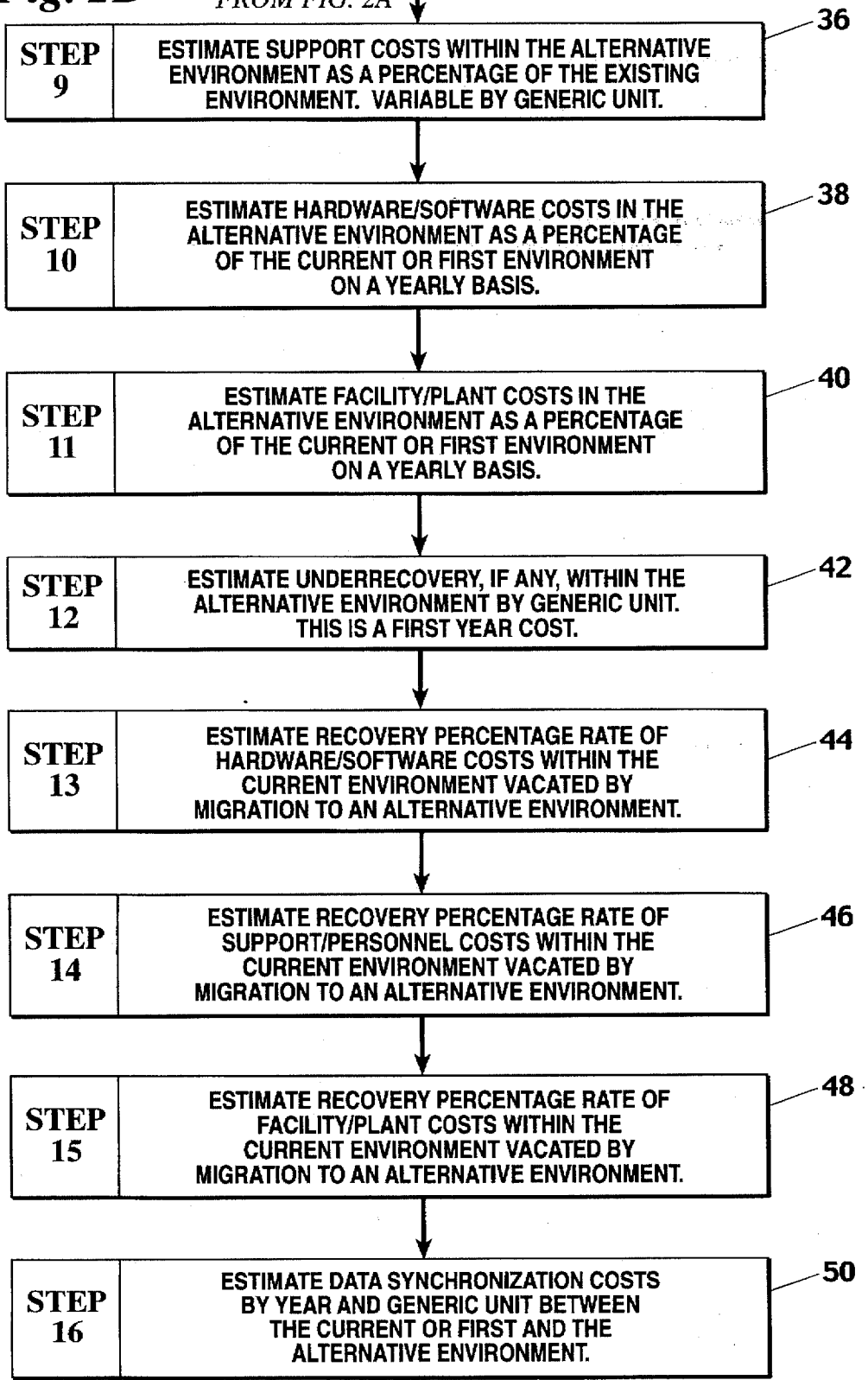
Figure 2C:
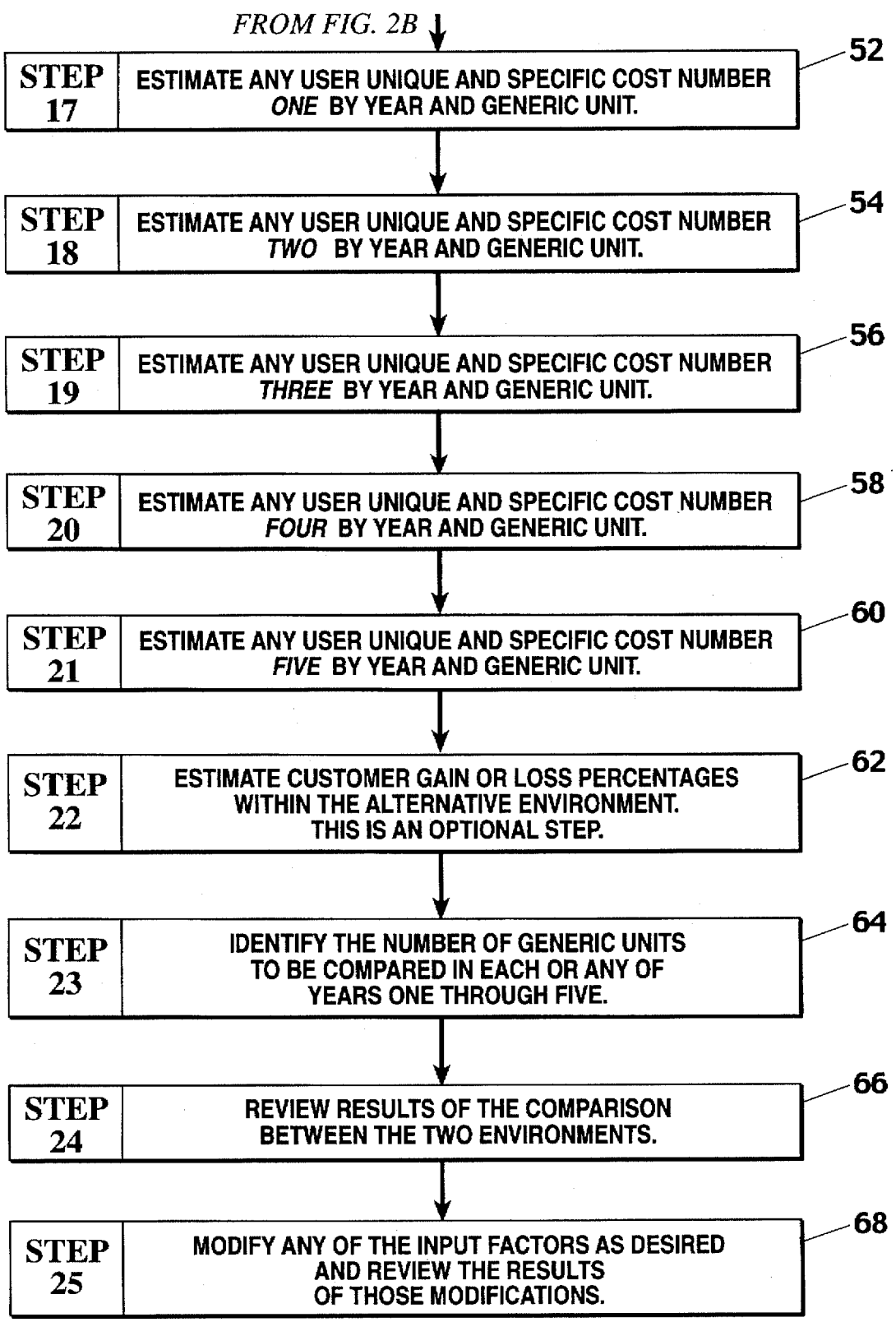

FIGS. 2(a), 2(b), and 2(c) illustrate the subsequent steps of the present system.

Referring to FIG. 2A, the first two steps, shown at boxes 21 and 23, have previously been described in the example above. That is, the total yearly cost of operating an existing computer platform are gathered and then divided by the total number of function application performed by the existing computer platform. This in an arbitrary calculation known as the generic computing unit. Thereafter, the percentage of the total cost in the existing platform attributable to categories is determined as previously described in boxes 18, 20 and 22.

A selected time period (TIME 2) will be chosen in which to evaluate and compare the platforms. In a preferred embodiment, a time period of nine (9) years is chosen.

Thereafter, year to year changes which are projected to occur within the existing computer platform are estimated as shown at boxes 24, 26 and 28. These changes are expressed as a percentage change to the existing computer platform. These estimates are set forth as a positive or negative percentage change over the prior year. A positive percentage will be treated as an increase; a negative percentage will be treated as a decrease.

TABLE A

| Year | Hardware and Software | Support and Personnel | Facility |
|---|---|---|---|
| 2 | −10.00% | 4.00% | −2.00% |
| 3 | −10.00% | 4.00% | −2.00% |
| 4 | −10.00% | 4.00% | −2.00% |
| 5 | 5.00% | 4.00% | −2.00% |
| 6 | 0.00% | 4.00% | 0.00% |
| 7 | 0.00% | 4.00% | 0.00% |

TABLE A-continued

| Year | Hardware and Software | Support and Personnel | Facility |
|---|---|---|---|
| 8 | 0.00% | 4.00% | 0.00% |
| 9 | 0.00% | 4.00% | 0.00% |

Table A shows an example of projected changes in costs over a nine (9) year period in each of the three broad categories. The year 1 costs are identified as the generic computing unit costs.

In year 2, the hardware and software costs are projected to decrease by 10% from the year 1 base costs. At the same time the support and personnel costs are anticipated to increase 4% over the year 1 base costs. Additionally, the facility and plant costs are anticipated to decrease 2% in the second year over the year 1 base costs.

Each of these percentage changes is a change to the prior year. Table A shows the projected changes over a nine year period in each category.

Existing Platform Revenue Projections

As an option, the yearly change in the customer base may be projected within the current platform and current cost structure. This factor impacts revenue in the current environment as shown at box 30. The percentage loss or gain of revenue is projected if the existing computer platform is supported. This optional factor is shown as a percentage change as to revenue gain or loss potential. A negative percentage indicates a customer risk loss and is treated as a cost. A positive percentage change implies additional customers will be supported within the current cost base and is treated as a cost offset. Some computer systems perform strictly service functions and are not directly concerned with revenues. Accordingly, this is an optional factor that may be ignored if only costs are under consideration.

TABLE B

| Year | Customer Base |
|---|---|
| 1 | 4.00% |
| 2 | 0.00% |
| 3 | −4.00% |
| 4 | −6.00% |
| 5 | −4.00% |
| 6 | 0.00% |
| 7 | 0.00% |
| 8 | 0.00% |
| 9 | 0.00% |

As seen in Table B, in year 1, the customer base under the current computer platform is projected to expand by 4%. This factor is applied to the total cost base 12 in the existing platform. Accordingly, 4% will be subtracted from the existing platform costs in the first year.

Training Costs

The training costs for moving the proposed application functions to the alternate computer platform are estimated as shown at box 32. The training costs are estimated per generic application function. The total projected training costs for migrating the application under consideration are estimated.

As an example, if the total number of application functions is 1000, and if migration of an application which comprises 10% of the total cost base is being considered, then 100 generic units are being moved. If the total projected training costs for the migration are two million five hundred thousand dollars ($2,500,000), the training cost per generic unit is twenty five thousand dollars ($25,000).

TABLE C

| Training Costs Per Generic Unit | | Cost Per Unit |
|---|---|---|
| First | 10 | $20,000 |
| Next | 20 | $10,000 |
| Next | 20 | $5,000 |
| Next | 50 | $4,000 |
| Next | 100 | $3,000 |
| Next | 300 | $2,000 |
| Next | 500 | $1,000 |
| Next | 0 | $0 |
| Next | 0 | $0 |
| Next | 0 | $0 |

As seen in Table C, it is possible to project training costs across multiple applications. The training costs for the initial generic units will generally be higher than training costs for later units. It is also possible to adjust the number of generic units and the cost per unit. The training costs are actual costs in dollar amounts and are added to the alternate platform costs.

Conversion Costs

The cost to convert from the existing computer system platform to the projected platform will also be estimated as shown at box 34. As previously described, in order to migrate an application, the program code must be able to run on the alternate platform. The conversion costs are estimated on a per generic unit basis. As an example, there may be a total current platform yearly cost base of ten million dollars ($10,000,000) and one thousand (1000) applications, so that each generic unit is ten thousand dollars ($10,000). If migration of an application or applications comprise 10% of the total cost base or one million dollars ($1,000,000), then the projected movement is ten generic units. If the total projected conversion costs are two hundred fifty thousand dollars ($250,000), the cost per generic unit is twenty five thousand dollars ($25,000).

Table D shows the conversion costs per generic unit. The conversion costs are actual costs in dollars and are added to the alternate platform costs.

TABLE D

| Conversion Costs Per Generic Unit | | Cost Per Unit |
|---|---|---|
| First | 20 | $15,000 |
| Next | 20 | $14,000 |
| Next | 20 | $13,000 |
| Next | 20 | $12,000 |
| Next | 20 | $11,000 |
| Next | 100 | $10,000 |
| Next | 800 | $8,000 |
| Next | 0 | $0 |
| Next | 0 | $0 |
| Next | 0 | $0 |

Alternate Platform Costs

The next factors are percentage changes applied against the existing computer platform. The costs for each category in the alternate computer system platform are next estimated. The costs in each category are estimated as a percentage of the existing computer system platform costs. This does not assemble the costs of the alternate environment, but identifies cost factors associated with operation of the application.

TABLE E

| Support Costs Per Generic Unit | | Projected Percent Per Unit |
|---|---|---|
| First | 20 | 300% |
| Next | 20 | 200% |
| Next | 20 | 150% |
| Next | 20 | 100% |
| Next | 20 | 75% |
| Next | 900 | 50% |
| Next | 0 | 0% |
| Next | 0 | 0% |
| Next | 0 | 0% |
| Next | 0 | 0% |

As seen in table E, initially, the support and personnel costs in the alternate environment are estimated or projected (box 36). This is a percentage estimate showing comparison or changes in relation to the current, existing platform. For a simplified example, if the support and personnel costs within the current platform are one thousand dollars ($1,000), and the alternate platform cost is estimated at one thousand two hundred dollars ($1,200), then the percent to be applied is 120%.

The support and personnel costs may also vary dependent on the number of generic units to be moved. Accordingly, as an example, Table E breaks down the support costs initially in twenty unit increments.

TABLE F

| Hardware/Software Costs vs. Current Environment | | Projected Percent Per Unit |
|---|---|---|
| Year | 1 | 40% |
| Year | 2 | 50% |
| Year | 3 | 65% |
| Year | 4 | 75% |
| Year | 5 | 90% |
| Year | 6 | 95% |
| Year | 7 | 100% |
| Year | 8 | 100% |
| Year | 9 | 100% |

Next, the hardware and software costs for the alternate platform are estimated (box 38), as shown in Table F. Again, this is projected as a percentage estimate compared to the current computer platform on a year to year basis. As shown in the example in Table F, the hardware and software costs in the alternate platform are projected to be 40% of the current computer platform in year one. The hardware and software costs may also vary dependent on the number of generic units to be moved.

TABLE G

| Facility/Plant Costs versus Current Environment | | Projected Percent Per Unit |
|---|---|---|
| Year | 1 | 30% |
| Year | 2 | 40% |
| Year | 3 | 50% |

TABLE G-continued

| Facility/Plant Costs versus Current Environment | | Projected Percent Per Unit |
|---|---|---|
| Year | 4 | 60% |
| Year | 5 | 70% |
| Year | 6 | 70% |
| Year | 7 | 70% |
| Year | 8 | 70% |
| Year | 9 | 70% |

The facility and plant costs in the alternate environment would be projected in the same manner (box 40). This is a percentage estimate showing comparison or changes in relation to the current, existing platform. As shown in Table G, the facility and plant costs in the alternate environment are estimated as 30% of the existing platform environment.

Alternate Platform Underrecovery

The present invention includes a procedure to estimate possible underrecovery or underutilization that may occur within the alternate platform environment, as shown at box 42. It is possible that a certain amount of underrecovery may occur when a new computer platform is first installed. This may occur if the new platform has more capacity than is used by the initial applications placed on the platform. If only a portion of the computer platform were to be charged to the applications migrated, than the unused portion is a cost of operation that is not recovered or accounted for. Underutilization may disappear quickly over time but may be substantial in the initial time periods and initial applications.

This is a percentage value calculated against the new platform cost. An additional cost is added to the alternate platform equal to the number of generic units times the dollar value of each generic unit times the percentage attributable to hardware and software times the underrecovery percentage.

TABLE H

| Underrecovery per generic unit within alternative environment | | Projected Percent Per Unit |
|---|---|---|
| First | 5 | 200% |
| Next | 5 | 100% |
| Next | 10 | 50% |
| Next | 980 | 0% |
| Next | 0 | 0% |
| Next | 0 | 0% |
| Next | 0 | 0% |
| Next | 0 | 0% |
| Next | 0 | 0% |
| Next | 0 | 0% |

As seen in Table H, this is expressed as a percentage. If the first proposed migration is 10 generic units, but the new computer platform can support 30 generic units, there would be an under-recovery of two hundred percent (200%). At the time a new platform is used to plant capacity, there would be zero underrecovery.

Current Platform Recovery

The recovery rate of the current computer platform to be vacated is thereafter estimated. The present platform may be reused by growth or physical removal of the vacated space. For example, in a relatively static environment, it may take time to remove any such costs from the existing platform. Conversely, in a high growth situation, the reuse of the vacated space may occur quickly. The reuse or elimination of current hardware/software is indicated in Table I as percentage values over the first four years after migration (see box 44).

TABLE I

| Reuse or Elimination of Vacated Current Environment Hardware/Software | | Percent |
|---|---|---|
| Year | 1 | 25% |
| Year | 2 | 50% |
| Year | 3 | 100% |
| Year | 4 | 100% |

As an example, only twenty five percent (25%) of the indicated space may be reused within the first year, fifty percent (50%) in the second year and one hundred percent (100%) thereafter. The unused vacated hardware/software is treated as a cost of migration since this effects the entire enterprise. An additional cost is added to the alternate platform costs equal to the number of generic units times the dollar value of each generic unit times the percentage attributable to hardware and software times the recovery rate percentage.

TABLE J

| Reuse, redeployment or Elimination of Current Support/Personnel Resource | | Percent |
|---|---|---|
| Year | 1 | 50% |
| Year | 2 | 100% |
| Year | 3 | 100% |
| Year | 4 | 100% |

TABLE K

| Reuse or Elimination of Current Environment Facility/Plant Costs | | Percent |
|---|---|---|
| Year | 1 | 20% |
| Year | 2 | 40% |
| Year | 3 | 75% |
| Year | 4 | 100% |

The recovery rate of the present support and personnel resources, and the recovery rate of the facility and plant costs would also be projected in like manner as seen in Tables J and K, respectively. These are shown in FIG. 2(B) at boxes 46 and 48, respectively.

Data Synchronization

The present system provides a mechanism to optionally estimate the data synchronization costs between the current computer platform and the alternate computer platform, as shown at box 50.

In some cases there is an interrelation or sharing of data between multiple co-existing computer platforms. If data synchronization is required, this procedure allows estimation of the costs of data synchronization per generic unit between two computer platforms. Data synchronization refers to the effort and resources needed to keep duplicate or distributed data sources in sync. For example, an application for payroll operating that resides on a midrange platform, might pass data to five different operating systems. Further these transfers must fit within a daily batch window. The available choices are to pass information between the systems on a transaction basis, or que queries and updates pass them en masse. Either way, the cost of network traffic and the jobs and transaction monitors that must run on both platforms to send and accept data requests, must be considered.

TABLE L

| Data Synchronization Costs Per Generic Unit | | Cost Per Unit |
|---|---|---|
| Year | 1 | $1,000 |
| Year | 2 | $1,000 |
| Year | 3 | $1,000 |
| Year | 4 | $500 |
| Year | 5 | $500 |
| Year | 6 | $500 |
| Year | 7 | $0 |
| Year | 8 | $0 |
| Year | 9 | $0 |

As shown in Table L, the costs might be one thousand dollars ($1,000) per generic unit for each of the first three years, five hundred dollars ($500) per generic unit for the next three years and zero dollars thereafter. No further data synchronization would be required.

Unique Costs

As an option, there may be certain costs relating to the alternate environment platform unique to a given business organization or given situation as shown at boxes 52, 54, 56, 58 and 60. As an example, a certain specific tax may be projected that is not taken into account elsewhere.

TABLE M

| User Identified Cost 1 Per Generic Unit | | Cost Per Generic Unit |
|---|---|---|
| Year | 1 | $0 |
| Year | 2 | $0 |
| Year | 3 | $0 |
| Year | 4 | $0 |
| Year | 5 | $0 |
| Year | 6 | $0 |
| Year | 7 | $0 |
| Year | 8 | $0 |
| Year | 9 | $0 |

As seen in Table M, these are expressed as costs per generic unit for each year after an application is installed in the alternate environment.

Similar tables could be generated for other unique costs.

Alternate Platform Revenue Projections

As with the existing computer platform, it is possible to project the yearly percentage change in customer base within the alternate platform as shown at box 62. The percentage loss or gain of revenue is projected if the alternate computer platform is supported.

This factor can be a major motivation for choosing a platform but can be a difficult factor to estimate. Some computer systems perform strictly service functions and are not directly concerned with revenues. Accordingly, this is an optional factor that may be ignored if only costs are under consideration.

TABLE N

| Year | Customer Base |
|---|---|
| 1 | 4.00% |
| 2 | 0.00% |
| 3 | −4.00% |
| 4 | −6.00% |
| 5 | −4.00% |
| 6 | 0.00% |
| 7 | 0.00% |
| 8 | 0.00% |
| 9 | 0.00% |

As seen in Table N, this optional factor is shown as a percentage change as to revenue gain or loss potential. A negative percentage denotes a customer risk loss and is treated as a cost. A positive percentage implies that additional customers will be supported without additional cost and is treated as a cost offset.

This factor is applied to the total cost base in the alternate platform.

Timing of Movement

The number of generic units that are to be moved in each of the first few years may be scheduled as shown at box 64. The full number of application functions may not be moved initially but may be phased in over a period of years.

TABLE O

| | Cost per Generic Unit | |
|---|---|---|
| Year | Number of Generic Units Compared | Cumulative |
| 1 | 101 | 101 |
| 2 | 50 | 151 |
| 3 | 100 | 251 |
| 4 | 100 | 351 |
| 5 | 649 | 1000 |

As seen in the example in Table O, all of the generic units are migrated over a five year period. If less than all units are to be migrated, then a lesser number of generic units should be entered.

Finally, each of the foregoing factors is applied as described herein to produce comparative costs of the alternate platform against the existing platform. The comparison is only for that portion of the total generic units that are under consideration for migration.

The results are shown in Table P.

TABLE P

| Year | Current or First Environment | Alternative Environment | Yearly Alternative Advantage (Disadvantage) | Cumulative Alternative (Disadvantage) |
|---|---|---|---|---|
| 1 | $9,696,000 | $16,529,997 | ($6,833,997) | ($6,833,997) |
| 2 | $13,843,680 | $16,997,760 | ($3,154,080) | ($9,988,077) |
| 3 | $22,942,284 | $26,129,428 | ($3,187,145) | ($13,175,222) |
| 4 | $32,726,560 | $35,528,628 | ($2,802,068) | ($15,977,290) |
| 5 | $99,693,607 | $135,662,377 | ($35,968,770) | ($61,946,060) |
| 6 | $100,981,196 | $103,521,453 | ($2,540,257) | ($54,486,317) |
| 7 | $102,320,268 | $86,271,801 | $16,048,487 | ($38,437,830) |

TABLE P-continued

| Year | Current or First Environment | Alternative Environment | Yearly Alternative Advantage (Disadvantage) | Cumulative Alternative (Disadvantage) |
| --- | --- | --- | --- | --- |
| 8 | $103,712,944 | $82,625,740 | $21,087,203 | ($17,350,627) |
| 9 | $105,161,306 | $83,461,451 | $21,699,855 | $4,349,228 |

It is possible to modify one of the input factor as shown at box 66 and 68. Once entered, all of the factors are again applied to produce comparative costs of the alternate platform against the existing platform. Any of the input factors may be modified so that the results will indicate the sensitivity of that factor.

Whereas, the present invention has been described in relation to the drawings attached hereto, it should be understood that other and further modifications, apart from those shown or suggested herein, may be made within the spirit and scope of this invention.

What is claimed is:

1. A process to evaluate movement from an existing computer system platform to an alternate computer system platform for at least one application function, which process comprises:
   a. determining the cost of a generic computing unit by dividing the total costs of said existing computer system platform for a predetermined period of time by the total number of application functions;
   b. determining the percentage of costs of said generic computing unit attributable to at least one category;
   c. projecting percentage cost changes for said existing computer system platform for selected time periods in each said category;
   d. estimating training costs per generic computing unit for said alternate computer system platform;
   e. estimating conversion costs per generic computing unit;
   f. estimating on a percentage of said existing platform basis applied to said generic computing unit, the cost of each said category in said alternate computer system; and
   g. applying step c., d., e., and f. to said generic computing unit to produce comparative cost of said alternate platform.

2. A process as set forth in claim 1 wherein said percentage of costs of said generic unit are in the categories of hardware and software, support and personnel, and facility and plant costs.

3. A process as set forth in claim 1 including the additional steps of estimating the yearly percentage change in customer base in said existing computer system platform, and applying said percentage change to said total costs of said existing platform.

4. A process as set forth in claim 1 including the additional steps of estimating any under recovery in said alternate platform for more capacity than used on a percentage basis of said generic unit for said selected time periods, and applying said percentage change to said generic computing unit.

5. A process as set forth in claim 1 including the additional steps of estimating the recovery rate of said existing platform of each said category for reuse or removal from said existing platform on a percentage basis of said generic unit.

6. A computer system for optimizing choice of a computer system platform between an existing computer system platform and an alternate platform, which comprises:

storage means for storing total yearly costs of said existing computer system platform including categories of hardware and software, support and personnel, plant and facility costs; and processing means to determine cost of a generic computing unit by dividing said total costs by the total number of application functions of said existing computer system platform, determine the percentage costs of said generic unit in each of said categories, applying the projected yearly percentage cost changes for said existing platform for a select number of years to said generic computing unit, applying training costs per generic computing unit for said alternate platform, applying conversion costs per generic computing unit, and estimating the costs in each category of said alternate platform as a percentage of said existing platform generic computing unit.

7. A computer system as set forth in claim 6 wherein said processing means includes applying projected percentage changes in customer base in said existing platform to said total costs.

8. A process for allocating computer resources for processing application functions between an existing computer platform and an alternate platform, which process comprises:

a. obtaining the cost of a generic computing unit from the quotient of the total costs of said existing computer platform for a selected time period divided by the total number of application functions;
   b. determining the percentage of costs of said generic computing unit attributable to categories of at least hardware and software, support and personnel, and facility and plant costs;
   c. projecting percentage cost changes for said existing computer system platform for selected time periods in each said category;
   d. estimating training costs per generic computing unit for said alternate computer platform;
   e. estimating conversion costs per generic computing unit;
   f. estimating, on a percentage of said existing platform basis applied to said generic computing unit, the costs of each said category in said alternate computer platform; and
   g. applying steps c., d., e., and f. to said generic computing unit to produce comparative costs for said alternate platform.

* * * * *